Patented Feb. 13, 1951

2,541,748

UNITED STATES PATENT OFFICE 2,541,748

TOUGH, BOARDY THERMOPLASTICS

Lawrence E. Daly, Osceola, Ind., assignor to United States Rubber Company, New York, N. Y., a corporation of New Jersey No Drawing. Application December 9, 1942, Serial No. 468,428

3 Claims. (Cl. 260—45.5)

This invention relates to improvements in molding compositions, and more especially to compositions having a high degree of stiffness, toughness, and resiliency, due to combination with natural rubber, or artificially-prepared rubber, or both, of a resinous inelastic polymer or copolymer of a butadiene.

More especially, the invention relates to the thermoplastic vulcanization product of the mix composed essentially of a vulcanizable rubber, a curing agent sufficient to cure said rubber to a soft or semi-hard rubber state, and a hard resinous inelastic polymerization product of a butadiene. Such a hard resinous polymer may be produced, among other ways, from polymerizing or copolymerizing the butadiene in emulsion past the elastic state of the polymer or copolymer, to a point that when the artificial latex is dried, a hard inelastic resinous film is formed. An oxygen-producing catalyst is usually used during the polymerization. The softening point of the resin may be varied over a wide range, for example, 120° F. to 250° F., by controlling the degree of the polymerization. The resin, whether a polymer or copolymer of the butadiene, is broadly termed herein an inelastic resinous polymerization product of a butadiene.

The following is illustrative of a preferred composition, the parts being by weight:

| | Parts |
|---|---|
| Hard inelastic thermoplastic resinous copolymer of butadiene and styrene[1] | 60 |
| Rubber-like elastic copolymer of butadiene and styrene (Buna S) | 40 |
| Zinc oxide | 3 |
| Stearic acid | 1 |
| Altax (accelerator) (benzothiazyl disulphide) | 1 |
| Sulfur | 1.5 |

[1] Manufactured by the Marbon Corporation, Gary, Indiana, under the name Marbon S. This material has a Shore hardness, over 100, and a softening point between 150° F. and 220° F.

The composition is compounded on a rubber mill in the same manner as is natural rubber, except that the mill rolls are heated to about 200° F. First, the hard resinous copolymer is heated on a hot mill until it has become thermoplastic, and then the Buna S, which is a copolymer of butadiene and styrene, (or other rubber including natural rubber or elastic copolymer of butadiene and acrylonitrile (Buna N) or polychloroprene (neoprene)) is added slowly until it has become thoroughly mixed in. Thereafter the accelerator, antioxidant, and any desired fillers are thoroughly mixed in. This is followed by the sulfur, the mill roll temperature being lowered to about 125° F. before the sulfur is added. The whole procedure takes about 15 minutes. The material is then ready to be heat cured, at which time it can also, if desired, be molded or formed into any desired shape.

The composition is subjected to a cure for 15 minutes or longer, at a curing temperature of from about 200° F. to about 300° F. During this step a physico-chemical change takes place that causes the material as a whole to acquire thermoplastic properties. At temperatures below those indicated, at which the composition is merely hot and incompletely cured, the material shreds like an art-gum eraser, is weak, and cannot be drawn or molded into shape.

The cured thermoplastic, at room temperature, is a hard tough boardy material. It has a number of interesting characteristics, among them being that when heated up to approximately 220° F. to 350° F. the material is extremely thermoplastic and can be molded very easily into all shapes and sizes; then when it is cooled down, it regains its original stiffness, toughness, and tenacity. Furthermore, it retains its toughness at low temperatures, for example, at 40° F. below zero, it is still resistant to shattering by impact, also it does not begin to soften until it reaches temperatures of about 160° F. and above. The hard boardy material is also highly resistant to the action of gasoline and other like fuels, softening and swelling to only a slight degree.

The material after being cured in sheet form and heated so as to become soft and plastic has characteristics similar to ordinary soft vulcanized rubber. The heated sheets may be stretched and formed over a mold or object, without wrinkling. A slight stretching during the molding operation causes a molecular change in the material, and on cooling the material before removal from the mold, this molecular change is retained in the finished article, which in turn has increased tensile strength, impact resistance, recovery from deformation and a great degree of flexibility.

If a flat sheet with the improved physical properties is first molded and vulcanized in a platen press to a predetermined thickness, it may, if desired, be then remolded in a heated platen press to a thinner gauge and the sheet cooled before removing from the mold.

The above mix, given by example, results in a hard boardy material having the following properties:

| | |
|---|---|
| Specific gravity | 1.11–1.12 |
| Specific volume __cubic inch per lb__ | 25 |
| Density (based on specific gravity of 1.115 lb. per cu. in.) | .04 |
| Ultimate strength _____lbs./sq. in. | 2000–3000 |
| Elongation _____percent__ | 200–300 |
| Hardness, Shore Durometer | 80–95 |
| Molding properties, type— Thermoplastic (can be remolded) | |
| Burning rate—same as rubber | |
| Softening temperature _____°F__ | 160–200 |
| Molding temperature _____°F__ | 260–300 |
| Absorption—24-hour period: | |
| Water _____percent__ | 1–2 |
| 100 octane gasoline _____do____ | .5–1 |

The tough, strong thermoplastic composition may be converted into any desired shape for the prodution of various fabricated articles, laminated or not, and may be used in the manufacture of various products, e. g., electrical insulation purposes, toe boxes, dishes, novelties, and the like. For example, it may be calendered into sheets of the desired thickness and cut to the required size. Of great import is the fact that the vulcanized material can be rendered thermoplastic, and while in this state, shaped as desired to produce various articles, which on cooling are exceptionally strong.

In place of using the hard inelastic Marbon S (resinous Buna S) in the above formula, other hard thermoplastic resin polymers derived from the copolymerization of butadiene and acrylonitrile, or resinous polymers of chloroprene, may be used instead, or mixtures of any of these hard inelastic polymers may be used. The amounts of the butadiene and styrene or acrylonitrile to produce the elastic material are those usually used in the manufacture of synthetic rubber such as the Bunas, Hycar, Chemigum, etc. The Bunas are, generally, the elastic polymers and copolymers of butadiene, and Hycar and Chemigum are like Buna-N, essentially copolymers of butadiene and acrylonitrile. The proportion of the thermoplastic resin to the elastic polymer or copolymer of a butadiene, for the purposes of the invention, may range from equal parts by weight of each, to 90 parts of the resin to 10 parts of the elastic rubber or rubber-like component of the mix. The hardness and stiffness may be varied by varying the proportion of the hard resin to rubbery material.

The curing of the mix may be done by any of the known processes of hot vulcanization, namely, by steam, air, or otherwise. The temperature of heating is usually at a temperature from about 200° F. to 300° F. for 15 minutes or more, i. e., sufficient to bring about the thermoplastic properties in the cured material during the cure, and which when the material is cooled results in a hard, tenacious and horny-like product.

Having thus described my invention, what I claim and desire to protect by Letters Patent is:

1. A hard boardy thermoplastic which is the conversion product of heat and vulcanization at a temperature of from about 200° F. to about 300° F. of a mix composed essentially of a vulcanizable elastic rubber, a curing agent sufficient in amount to cure said rubber to a condition ranging from a soft to a semi-hard vulcanized state, and a normally solid thermoplastic hard inelastic resinous polymerization product derived from polymerizing a composition comprising butadiene and styrene, the proportion by weight of the hard resinous product ranging from 100 percent to 900 percent based on the elastic rubber.

2. A hard boardy thermoplastic which is the conversion product of heat and vulcanization at a temperature of from about 200° F. to about 300° F. of a mix composed essentially of an elastic copolymer of butadiene and styrene, sulfur sufficient in amount to cure said copolymer to a soft vulcanized state, and a hard inelastic resinous polymerization product derived from polymerizing a composition comprising butadiene and styrene.

3. A thermoplastic which is the heat-conversion product, at a temperature of from about 200° F. to about 300° F., of a mix composed essentially of an elastic copolymer of butadiene and styrene, a small amount of sulfur, and a normally solid thermoplastic hard inelastic resinous polymerization product derived from polymerizing a composition comprising butadiene and styrene, said thermoplastic heat conversion product having a hardness (Shore) of about 80 to about 95, a tensile strength of from about 2000 to about 3000 pounds per square inch, a softening temperature of from about 160° F. to about 220° F., and being highly resistant to water and gasoline.

LAWRENCE E. DALY.

REFERENCES CITED

The following references are of record in the file of this patent:

UNITED STATES PATENTS

| Number | Name | Date |
|---|---|---|
| 1,901,044 | Schmidt | Mar. 14, 1933 |
| 2,271,125 | Juve | Jan. 27, 1942 |

FOREIGN PATENTS

| Number | Country | Date |
|---|---|---|
| 492,998 | Great Britain | Sept. 30, 1938 |

OTHER REFERENCES

Whitby, Ind. and Eng. Chem., vol. 25, page 1205, November 1933.